Sept. 16, 1924.
F. JERDONE, JR
1,508,976
WHEEL SECURING BRACKET
Filed June 23, 1920
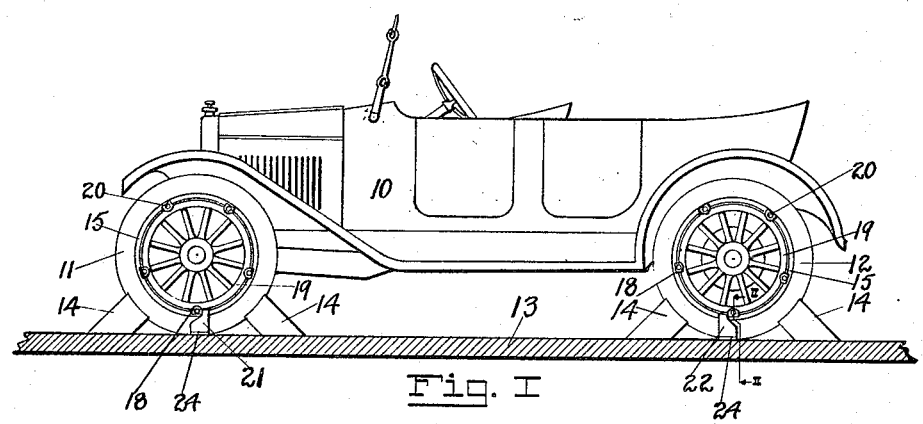
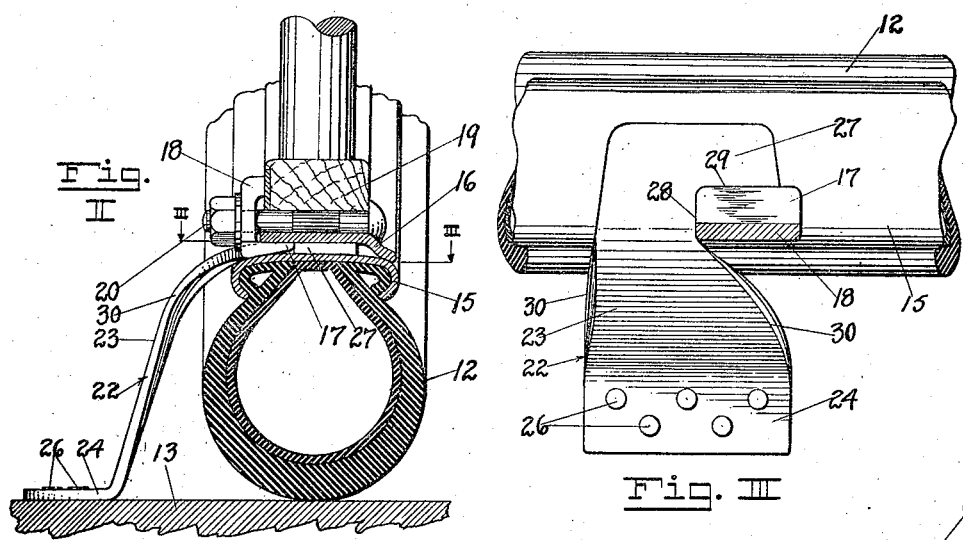
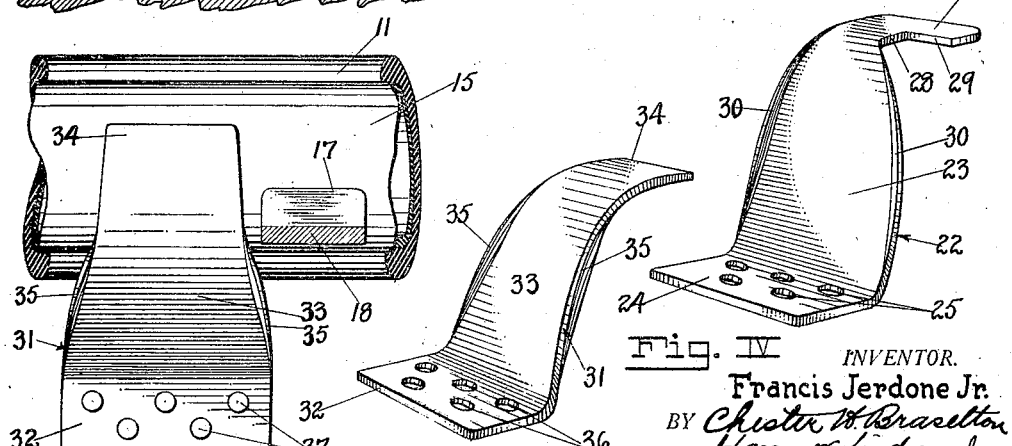
INVENTOR.
Francis Jerdone Jr.
BY
ATTORNEYS Patented Sept. 16, 1924.

1,508,976

UNITED STATES PATENT OFFICE.

FRANCIS JERDONE, JR., OF TOLEDO, OHIO, ASSIGNOR TO THE WILLYS-OVERLAND COMPANY, OF TOLEDO, OHIO, A CORPORATION OF OHIO.

WHEEL-SECURING BRACKET.

Application filed June 23, 1920. Serial No. 391,134.

*To all whom it may concern:*

Be it known that I, FRANCIS JERDONE, Jr., residing at Toledo, county of Lucas, State of Ohio, have invented certain new and useful Improvements in Wheel-Securing Brackets, of which I declare the following to be a full, clear, and exact description.

My invention relates to wheel securing brackets and has for its object to provide improved means for tying and bracing the wheels of an automobile or other vehicle during shipment to insure the delivery of the same in proper condition upon reaching its destination.

A further object of the invention is to provide an improved brace or tie bracket having a portion constructed in a manner to be insertable between the inner and outer sections of the wheel rim so as to overlie the inner horizontal face of the outer section for the purpose of securely tying the wheels to the floor or frame upon which the vehicle is mounted.

Another object of the invention is to provide a wheel tie adapted to secure the wheel upon a floor or frame without requiring the removal and replacement of any of the parts of the wheel in the application of the tie thereto.

To these and other ends the invention comprises certain novel features of construction and arrangement of parts as will be hereinafter more fully pointed out and claimed, it being understood that the invention is intended to include all modifications which fall within the scope of the appended claims.

A structure constituting one embodiment of my invention is illustrated in the accompanying drawings forming a part of this specification in which—

Figure I is a side elevation of an automobile showing the manner of bracing and tying the wheels thereof to the deck or floor upon which the machine is mounted for shipment.

Figure II is an enlarged sectional elevation taken on line II—II of Figure I.

Figure III is a fragmentary sectional plan taken on line III—III of Figure II.

Figure IV is a perspective view of the bracket shown in Figures II and III.

Figure V is a fragmentary sectional plan, similar to Figure III, with a modified form of bracket provided for tying the wheels of the vehicle to the floor or frame upon which it is mounted and Figure VI is a perspective view of the wheel tie bracket shown in Figure V.

Like reference characters throughout the several views of the drawings indicate corresponding parts.

In the shipment of automobiles from one point to another it is necessary to provide means for tying and bracing the wheels of the vehicle so that the latter will be securely held against displacement either longitudinally or laterally of the floor or deck upon which the vehicle is mounted and it is desirable that the means provided for this purpose be of such a nature as to insure its application to the wheels of the vehicle and to the floor upon which they rest with as little inconvenience and expense as possible. It is also desirable that such devices be constructed in a manner to enable them to be attached to the wheels of the vehicle by unskilled labor and that they be constructed in a way to permit their free insertion and removal from the wheels without disfiguring the same while in service and without requiring the removal or adjustment of any of the parts of the wheels. In carrying out the present invention, I have provided a wheel tie or brace having all of these characteristics which, after being applied to the wheels, may be readily nailed or otherwise secured to the deck or frame upon which the machine is mounted for shipment.

Referring to the drawing 10 represents an automobile having the front and rear wheels 11 and 12 respectively supported by the frame or floor 13 as shown in Figure I. In addition to the brackets the wheels may also be braced by means of suitable blocks 14 placed at opposite sides of each of the wheels as indicated in Figure I, said blocks being preferably constructed of wood and having curved faces to receive the treads of the wheels at points adjacent the floor 13 to which the blocks may be secured by nailing or in any other preferred manner. It will be understood of course that the blocks 14 serve to prevent longitudinal shifting of the automobile but do not prevent the raising of the wheels from the floor or serve in any way to tie the vehicle to the floor or frame upon which it rests. The wheels shown in the drawings are preferably of the demountable rim type and are provided with the usual pneumatic tires secured upon the outer rim section 15 carrying the inner rim section 16 between which projects the tapered portion 17 of the wedges 18 which are secured to the wheel felly 19 by means of the bolts 20 as shown in Figure II. The front and rear securing brackets 21 and 22 respectively are similarly constructed, with the exception that they are made rights and lefts, and a description of one will suffice for both. The bracket 22 is preferably formed of sheet metal of a thickness slightly less than or substantially equal to the distance between the demountable rim sections 15 and 16. The bracket comprises a body portion 23 having an angularly disposed plate or securing portion 24 provided with a series of holes 25 through which the screws or nails 26 are driven to secure the brackets to the floor or frame 13. The opposite extremity of the body of the bracket is provided with a hook shaped portion 27 bent upon the body to extend in an opposite direction to the base 24 and in a plane substantially parallel therewith. The inner edges 28 and 29 of the hook are adapted to engage one end and the rear side of the inwardly projecting portion 17 of the wedge respectively as shown in Figure III to prevent shifting of the vehicle either longitudinally or laterally upon the platform 13. The plate or bracket also serves to securely tie the wheel to the platform to prevent its moving out of contact therewith, while the brace blocks 14 form additional means for steadying the vehicle. The tie plate is preferably widened at its base with the sides tapering or converging towards the hooked end 27. The converging sides of the upstanding portion of the bracket are preferably provided with strengthening ribs or flanges 30 formed in any suitable manner as by turning the edges outwardly when the bracket is being constructed by means of suitable dies or otherwise as preferred. Another advantage in flaring the sides or edges of the upstanding portion of the bracket outwardly is to prevent the possibility of said edges coming in contact with and cutting the tire in case the latter is deflated and forced outwardly against the bracket. The hook portion 27 of the bracket is easily inserted between the rim sections 15 and 16 to engage the wedge 18 as shown in Figure III and with the wheel moved to proper position the bracket is nailed to the floor or frame, whereby the wheel is securely tied thereto. It will be understood that with the brackets positioned upon the wheels as shown in Figure I movement of the vehicle longitudinally in either direction is prevented regardless of whether or not the brace blocks 14 are used. In removing the brackets from the wheels it is only necessary to withdraw the nails or screws 26 after which movement of the brackets forwardly or rearwardly as the case may be, until the hooked portion 27 disengages the tapered portion 17 of the wedge, will bring them in position to be removed laterally from the wheels.

In the modified form of bracket shown at 31 in Figures V and VI the hook is omitted but otherwise the brackets are substantially the same. The bracket 31 is provided with a base or securing portion 32 bent at an angle to the upstanding body portion 33, the free end of which is bent in an opposite direction to the base 32 and substantially parallel therewith as clearly shown in Figure VI. The sides of the bracket 31 from the base portion outwardly, to and including the wheel engaging portion 34, converge or taper so that the outer extremity of the bracket is considerably narrower than the base. Between the base and wheel engaging portion the sides of the bracket are flanged or flared outwardly, as indicated at 35, to form strengthening ribs upon the bracket as well as to prevent the cutting of the tires, should they become deflated and forced outwardly against the bracket during shipment of the vehicle. The base portion 32 of the bracket 31 is provided with a series of holes 36 through which the nails 37 are driven to secure the bracket to the floor or platform 13.

While I have described the bracket 31 as being of a modified form, it will be understood that this term does not necessarily imply that the bracket 22 constitutes the preferred form, as either of the brackets may be used to advantage in securing the wheels of the vehicle to the floor or frame upon which it is mounted for shipment. It will be further understood that the brackets 31 may engage the ends of the wedges to prevent longitudinal movement of the vehicle the same as in the case of the brackets 22.

Since the brackets shown and described herein connect with or engage the wheels between the rim sections thereof they do not mar or disfigure the finish of the wheels as in the case of brackets which are attached to the exposed portions of the wheels and therefore no repainting or refinishing of the wheel is required after the vehicle reaches its destination.

It will be apparent to those skilled in the art that the invention shown and described herein is susceptible to various modifications, embodiments and arrangements to suit special or varying conditions and I wish it to be understood that the terms which I have used are merely descriptive and not limiting and that it is my intention to include any and all modifications which fall within the scope of the invention as defined in the appended claims.

Having thus described my invention, what I claim as new and desire to secure by Letters Patent is:

1. Means for securing a vehicle in fixed position upon a floor or frame comprising a tie-plate having a hooked portion adapted to extend between the sections of a demountable wheel rim behind one of the wedges projecting between said sections to interlock therewith, said plate having a base portion adapted to be secured to said floor or frame.

2. Means for securing a vehicle in fixed position upon a floor or frame comprising a tie-plate having a body portion provided with flared edges, one end of said body portion being hook shaped and adapted to interlock with one of the wedges projecting between the rim sections of the wheels of the vehicle, said body portion being adapted for connection to said floor or frame.

3. Means for securing a vehicle in fixed position upon a floor or frame comprising a tie-plate having a base portion adapted for connection to a floor or frame and a hooked portion adapted to engage one of the rim securing wedges of the vehicle wheel on two sides thereof between the spaced sections of the rim.

4. Means for securing a vehicle in fixed position upon a floor or frame comprising a tie-plate having a base portion adapted for connection to a floor or frame and a hooked portion adapted to engage one of the rim securing wedges of the vehicle wheel on two sides thereof between the spaced sections of the rim, said tie-plate having its side edges turned upwardly to strengthen the same and to protect a tire carried by the wheel.

In testimony whereof, I affix my signature.

FRANCIS JERDONE, Jr.